(12) United States Patent
Shu et al.

(10) Patent No.: US 7,116,265 B2
(45) Date of Patent: Oct. 3, 2006

(54) RECOGNITION ALGORITHM FOR THE UNKNOWN TARGET REJECTION BASED ON SHAPE STATISTICS OBTAINED FROM ORTHOGONAL DISTANCE FUNCTION

(75) Inventors: David B. Shu, Canoga Park, CA (US); Cynthia E. Daniell, Pasadena, CA (US)

(73) Assignee: Raytheon Company, Waltham, MA (US)

( * ) Notice: Subject to any disclaimer, the term of this patent is extended or adjusted under 35 U.S.C. 154(b) by 107 days.

(21) Appl. No.: 11/054,757

(22) Filed: Feb. 10, 2005

(65) Prior Publication Data

US 2006/0176209 A1    Aug. 10, 2006

(51) Int. Cl.
*G01S 13/90* (2006.01)
(52) U.S. Cl. ............... 342/25 R; 342/25 F; 342/90; 342/195
(58) Field of Classification Search ............ 342/25 R, 342/25 F, 90, 195
See application file for complete search history.

(56) References Cited

U.S. PATENT DOCUMENTS 6,259,396 B1 *  7/2001  Pham et al. .................. 342/90
7,015,855 B1 *  3/2006  Medl et al. ................ 342/25 R

* cited by examiner

*Primary Examiner*—Dan Pihulic
*(74) Attorney, Agent, or Firm*—Leonard A. ALkov; Karl A. Vick

(57) ABSTRACT

A method for classification of a target object having a periphery comprises the steps of: selecting a plurality of random first chords D1 across the periphery of the target object;
  measuring each of the first chords D1 to obtain a plurality of first dimensions;
  computing for each of the first chords D1 a second chord D2 across the periphery thus forming a plurality of D1, D2 pairs of chords;
  measuring the second chords D2 for all pairs to obtain second dimensions;
  computing for each of the pairs of first chords D1 and second chords D2 the ratio D1/D2 of the first dimension to the second dimension to obtain a plurality of first values;
  computing the logarithm of the first values to obtain a plurality of logarithmic values;
  computing difference values by subtracting the second dimension from the first dimension for each of the pairs;
  recording the first values, logarithmic values and difference values in histograms;
  extracting a vertex lists from the histograms;
  combining one or more of the vertex lists to obtain a signature indicative of the classification of the object target.

For each of the pairs, the second chords are orthogonal to the first chords, and the second chords share a point with the first chords and the periphery.

16 Claims, 4 Drawing Sheets

RECOGNITION ALGORITHM FOR THE UNKNOWN TARGET REJECTION BASED ON SHAPE STATISTICS OBTAINED FROM ORTHOGONAL DISTANCE FUNCTION

BACKGROUND OF THE INVENTION

1. Field of the Invention

This invention is in the field of extraction of target signatures using a probability distribution measuring geometric properties of the targets under consideration.

2. Description of the Related Art

An important function of a radar system, whether a Real Beam type, Synthetic Aperture (SAR) or Interferometric SAR is to detect a target as well as identify it. Radar target detection and identification have been proven necessary in military surveillance, reconnaissance, and combat missions. The detection and identification of targets provide real-time assessment of the number and the locations of targets of interest.

One method of target detection and identification is to process the image acquired by the radar using, for example, Synthetic Aperture Radar (SAR) technology. By processing a SAR generated image, the features of a target can be extracted and matched to a database for identification.

The general principle behind SAR is to obtain high resolution images by coherently combining the amplitude and phase information of separate radar returns from a plurality of sequentially transmitted pulses from a relatively small antenna on a moving platform. The returns from the plurality of pulses transmitted during a SAR image, when coherently combined and processed, result in image quality comparable to a longer antenna, corresponding approximately to the synthetic "length" traveled by the antenna during the acquisition of the image.

High resolution SAR maps are obtained by coherently combining return signals reflected from transmitted pulses in the cross range direction from radar platform movement. However, formation of focused SAR images or maps requires accurate information on platform position and velocity to shift and focus the received radar returns over the duration of the image acquisition time, the array length, so as to have a useful, phase adjusted combination of pulse returns from multiple pulses transmitted at different times from different radar positions. The process of aligning pulses in time and space for coherent integration is referred to as motion compensation, and is usually performed with the raw radar data, at the early stage of the image formation process.

One aspect of achieving coherent integration of pulses into one SAR image is the need for some form of inertial navigation/ground positioning satellite system (INS/GPS) to indicate the spatial and time coordinates of each transmitted and received (or reflected) pulse. These time and space coordinates of radar returns need to be known to a relatively high accuracy, typically in fractions of a wavelength, to arrive at a clear, focused, unsmeared image. Sometimes the alignment of pulses using the INS/GPS is imperfect, especially towards the edge of the image, introducing "snow" or a grainy character into the SAR image, making it difficult to discern target outline from its background.

It is this grainy character that tends to obfuscate a SAR image thus requiring robust algorithms to extract a target from the SAR image as well as identifying it. The radar image varies from radar to radar depending on the accuracy of the particular INS/GPS, the position of the target within the imaging area, instantaneous operating frequency, as well as glint/fading and target fluctuations. Thus, unlike photographic images, target detection and identification requires a robust approach capable of compensating for characteristics specific to a particular radar system, its operation and type of target being imaged and identified.

Attempts have been made towards target identification extracted from radar images. For example, J. Wissinger, et. al., in *MSTAR's Extensible Search Engine and Model-Based Inferencing Toolkit*, SPIE 13th Annual International Symposium on AeroSene, Algorithms for SAR Imagery VI, rely on models to implement an algorithm for target identification. During operation, all targets under consideration are forced into one of the known target classes. There is no mechanism to adapt for an unknown target. Thus a high false alarm rate is encountered.

Similarly, J. De Bonet, P. Viola, and J. Fisher, in *Flexible Histograms: A Multiresolution Target Discrimination Model*, SPIE Proceedings, 1998, rely only on multiscale features of targets. Again, this yields a relatively high false alarm rate.

Automatic target recognizers (ATR), typical of the type described by Wissinger above, have a tendency to erroneously place unknown objects, such as a bulldozer, into one of the known military target classifications. This results in a high false alarm rate. Thus, it is desired to develop a method for rejecting unknown targets especially in high resolution (1 ft) imagery.

Because of above limitations of the prior art high false alarm rates are encountered thus limiting the utility of an imaging and target detection radar.

SUMMARY OF THE INVENTION

Target detection is improved by a method for classification of a target object having a periphery comprising the steps of:

selecting a plurality of random first chords D1 across said periphery of said target object;

measuring each of said first chords D1 to obtain a plurality of first dimensions;

computing for each of said first chords D1 a second chord D2 across said periphery thus forming a plurality of pairs of chords;

measuring said second chords D2 for all pairs to obtain second dimensions;

computing for each of said pairs of first chords D1 and second chords D2 the ratio D1/D2 of said first dimension to said second dimension to obtain a plurality of first values;

computing the logarithm of said first values to obtain a plurality of logarithmic values;

computing difference values by subtracting said second dimension from said first dimension for each of said pairs;

recording said first values in a first histogram;

recording said logarithmic values in a second histogram;

recording said difference values in a third histogram;

extracting a first vertex list from said first histogram;

extracting a second vertex list from said second histogram;

extracting a third vertex list from said third histogram;

combining said first vertex list, and/or said second vertex list, and/or said third vertex list to obtain a signature, said signature indicative of the classification of said object target.

For each of said pairs, said second chords are orthogonal to said first chords, and for each of said pairs, said second chords share a point with said first chords and said periphery.

DETAILED DESCRIPTION OF THE INVENTION

The present invention describes an apparatus and method using an orthogonal function which allows the extraction of shape signature of objects using a probability distribution measuring geometric properties of the target object under consideration. This method is directed towards extracting the overall shape of the target object.

Figure 1:
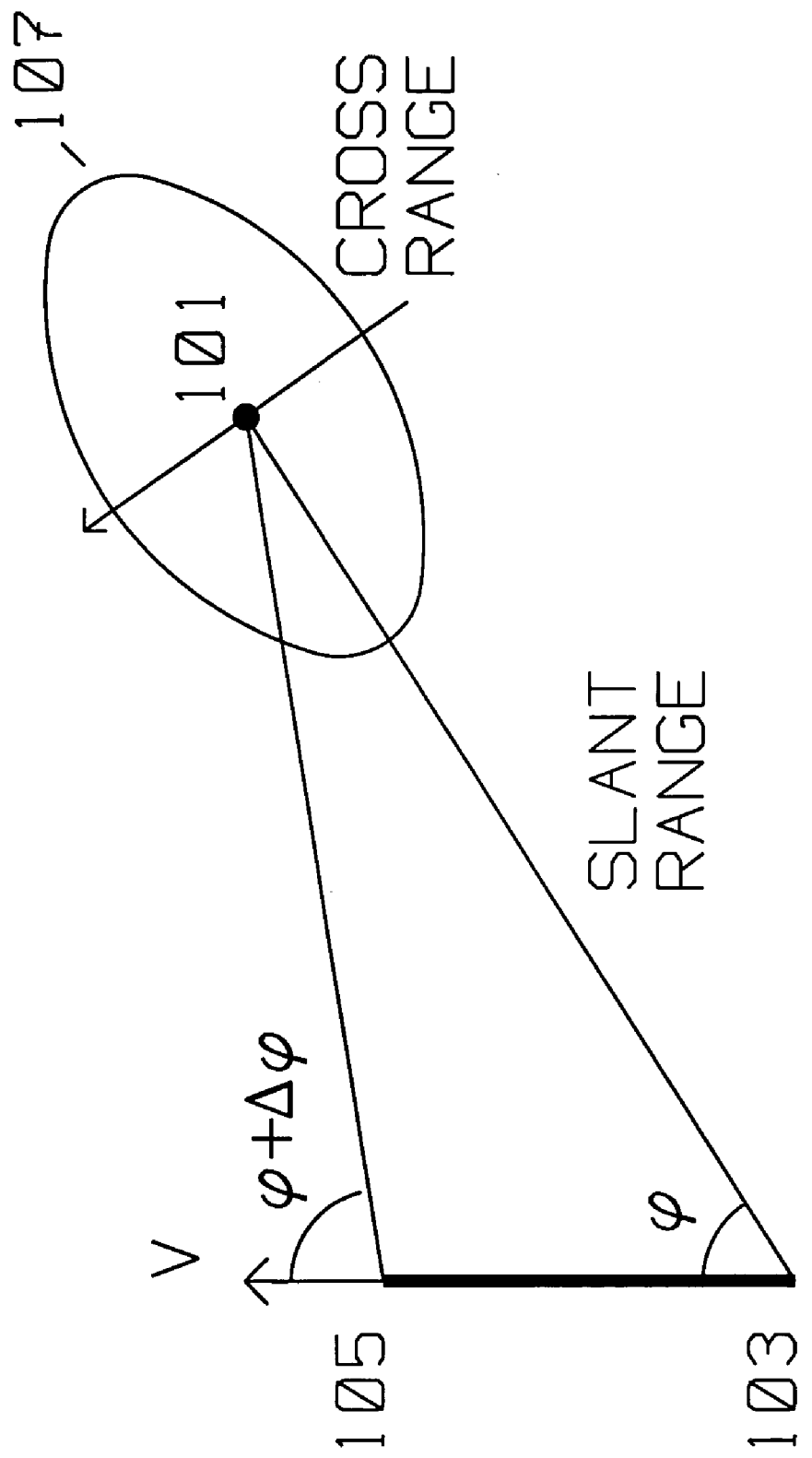
FIG. 1 is a SAR radar of the prior art used in generating an image of a target object to be classified using the present invention.

The first step is to acquire a Synthetic Aperture (SAR) image of the scene containing the target object to be classified. FIG. 1 shows the typical prior art geometric relationship between a moving platform carrying a radar transmitter/receiver using Synthetic Aperture (SAR) spotlight methods and scene 101 containing a target to be imaged by said radar transmitter/receiver. The moving platform is initially at position 103, travels with velocity V in the direction shown to position 105. In SAR spotlight mode, the SAR antenna is actively oriented towards scatterer 101 as the platform moves with respect to scatterer 101 with velocity V. The moving platform moves from position 103 to position 105, while adjusting the side looking angle from $\phi$ to $\phi+\Delta\phi$ for spotlight mode so that the antenna keeps illuminating scene 101. Antenna illumination with radar energy covers area 107 during the frame length, and includes scene 101. Similarly, the antenna receive pattern covers area 107, and includes scene 101. Radar pulses are transmitted and corresponding returns received at many points during the frame length between position 103 and position 105. SAR radar is well known in the art and, for example, is described by W. Carrara, et al, in *Spotlight Synthetic Aperture Radar*, Artech house, 1995, incorporated herein be reference in its entirety.

Figure 2:
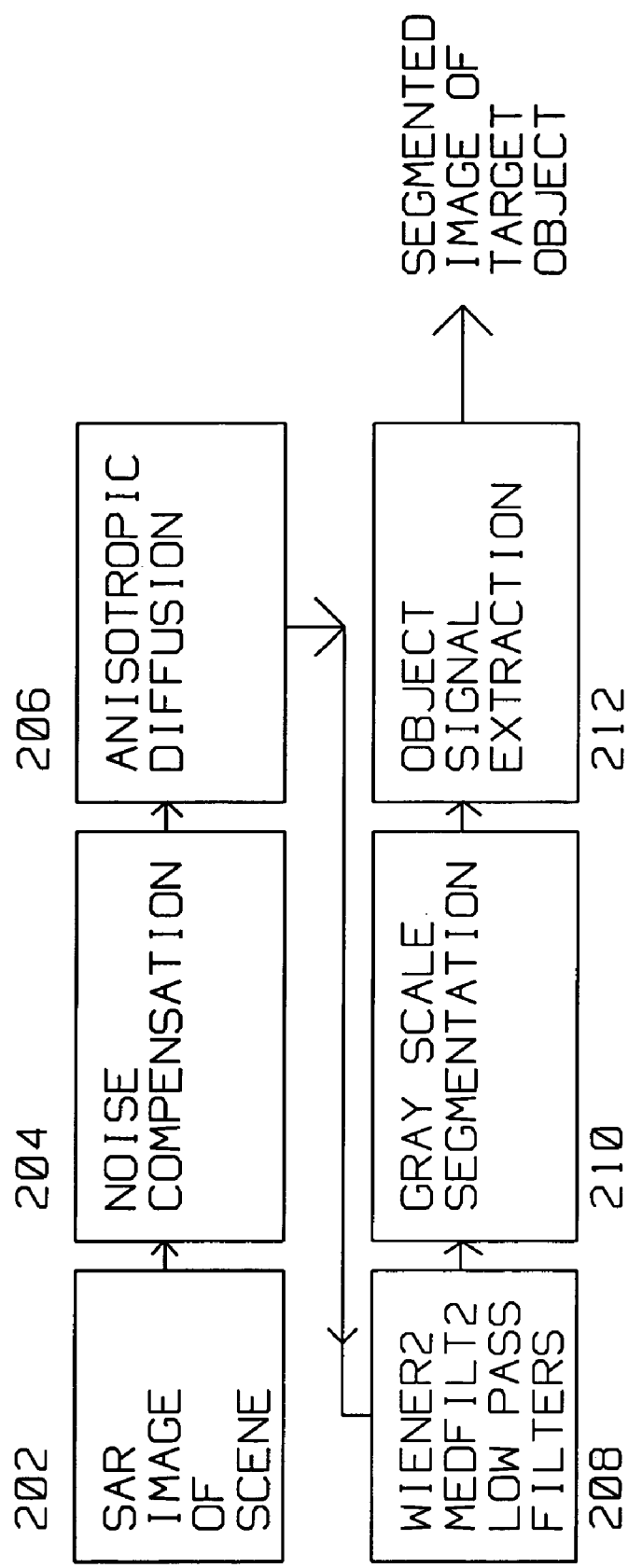
FIG. 2 is a flow diagram of the method used to extract a target object from a SAR image.

Having obtained a digitized SAR image of scene 101 containing the target object, the image is prepared for feature extraction of the target object, as shown in FIG. 2. SAR image of the scene 202 contains the target object to be analyzed and classified. The SAR image is noise compensated in Noise Compensation 204 using a multi-scale approach across six scales and six orientations. The expected value of the energy due to noise is estimated from the smallest scale filter. A noise threshold is then set three standard deviations above the mean of the noise.

Isotropic diffusion 206 boosts the contrast of the target object within the SAR image and isolates it from the background. This aspect uses diffusion to spread across low frequency content and inhibition to create bounds at the high frequency content thereby proving a better contrast/edge definition of the target object. This Isotropic diffusion is further detailed in *Scale Space and Edge Detection Using Isotropic Diffusion* by P. Perona and J Mavik, IEEE Transactions PAMI, Vol 12, July 1990.

Low pass filters 208, using for example a type Wiener2 and Medfilt2, further smooth the SAR background bringing out the features of the target object. This is followed by Gray scale segmentation 210. Object signal extraction 212 uses incremental binary thresholding followed by size filtering and directional edge linking to complete the extraction of distinct areas within the SAR image coalescing to define the target object. This procedure extracts a target object having a relatively well defined perimeter. This procedure is further detailed in Shape *Distributions* by R. Osada et al, Pattern Recognition Magazine, February 2002.

Figure 3:
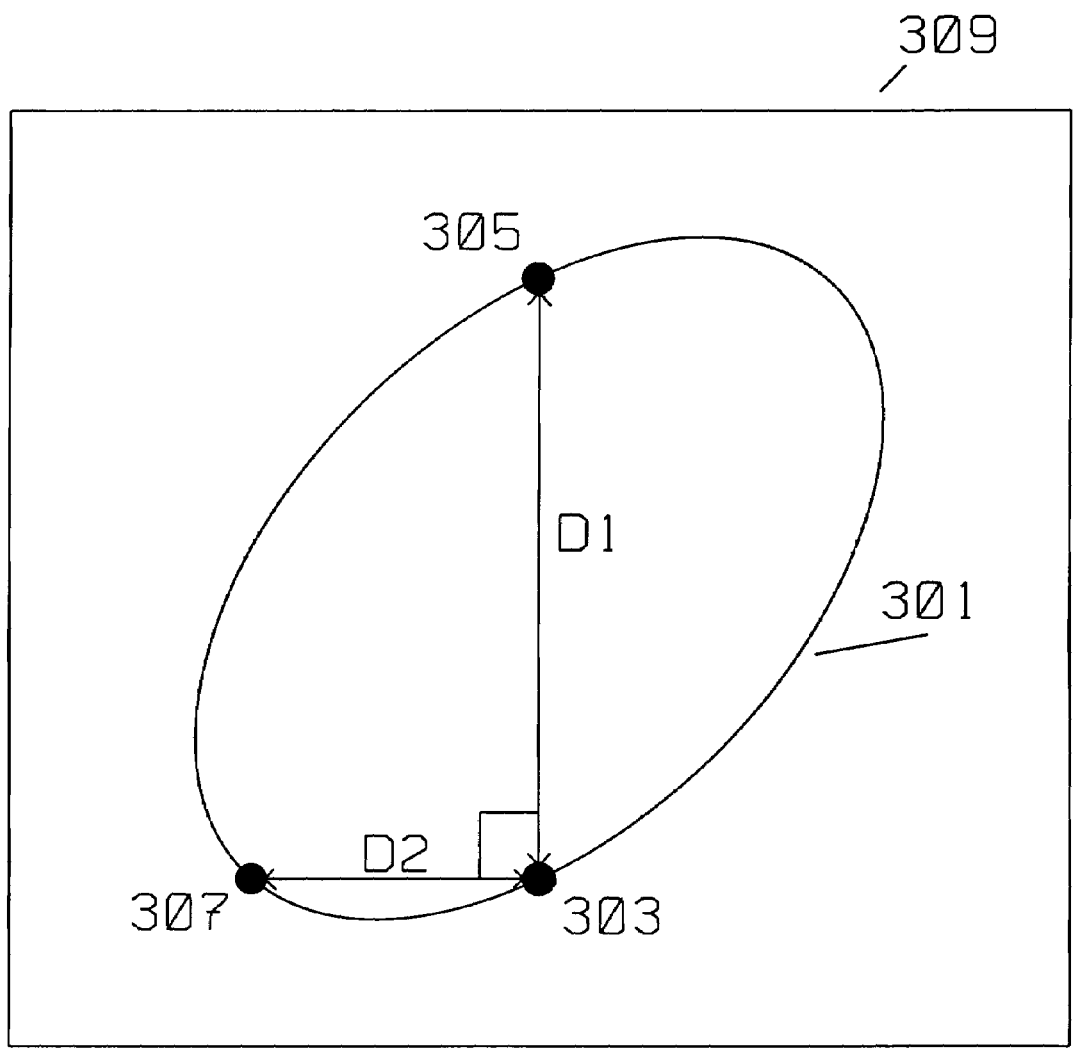
FIG. 3 shows the location of chords D1 and D2 along the periphery of an unclassified target object against a background.

The classification method for the target object extracted in FIG. 2 is detailed in FIG. 3. In FIG. 3, the perimeter 301 of the target object is clearly delineated against background 309 having been extracted, for example, from a SAR image, as shown in FIG. 2. D1 is a first chord across perimeter 301, gives the Euclidean distance measure between point 305 and point 303 on perimeter 301. A plurality of points, such as 305 and 303, are randomly selected around perimeter 301. D2 is a second chord, gives the Euclidean distance between point 307 and point 303 on perimeter 301. The distance D2 is chosen so that D2 is orthogonal to distance D1, that is, the D1 and D2 pair are spatially orthogonal (perpendicular to each other in the plane defined by perimeter 301.) For each of said pairs, the second chords D2 share a point with the first chords D1 and the periphery 301, as, for example, point 303.

Random sampling of perimeter 301 with points such as 303, 305 and 307 insures that the shape distributions are insensitive to small perturbations. That is, random sampling yields a plurality of pairs, such as D1 and D2 within perimeter 301. This property provides insensitivity of the classification method to scale, noise, blur, cracks and/or dust. Because of this, for example, distances D1 and D2 can be measured in feet, meters, or other convenient unit. The resolution of the units used has to be better than the lesser of 0.1·D1 or 0.1·D2 for the distance measurement.

For this method, two types distance functions M1 and M2 are defined:

Function M1 is D1–D2

Function M2 is log(D1/D2)

The results from M1 and M2, derived from the random selection of points such as 303, 305, and orthogonal point 307 around perimeter 301, are placed in a histogram. The histogram is a plot of the distances computed in M1 and M2 vs the probability of M1 and M2 for the object. The vertices of the histogram are recorded as the shape feature vector which is then classified with a model based on Adaptive Resonance Theory.

Method Steps.

The method of classifying a target object is exemplified by the use of a synthetic aperture radar (SAR) for acquiring the target object in a scene and computing a classification for said target object in accordance with this invention. The classification method of this invention for a target object having a clear periphery against a background is further detailed in FIG. 4. Obtaining and preparing the radar data for subsequent classification of a target object comprises the following steps, generally illustrated in FIG. 2.

1) Using A/D converters to convert a plurality of radar returns from said scene into a digital stream.

2) Converting said digital stream into a synthetic aperture image using known techniques of computing SAR images. This generates a SAR image of the scene containing the target object of interest.

3) Extracting portions of said synthetic aperture image containing said target object to obtain a target region. The whole SAR image need not be considered as only a portion of it, the target region, contains the information related to the target object.

4) Applying noise compensation to said target region to obtain a noise compensated target region.

5) Applying anisotropic diffusion to said noise compensated target region to obtain an isolated target object. The target object is surrounded by a background.

6) Applying a low pass filter to said isolated target object to obtain a low pass filtered isolated target. Examples of low pass filters are Wiener2 and Medfilt2 (Median Filter), well known in the art.

7) Applying gray scale segmentation to said low pass filtered isolated target to obtain a segmented target.

9) Applying object signal extraction to said segmented target to obtain a segmented image of said target subject, said segmented image having a periphery. The goal is to have a well defined periphery outlining the target object against the background.

Figure 4:
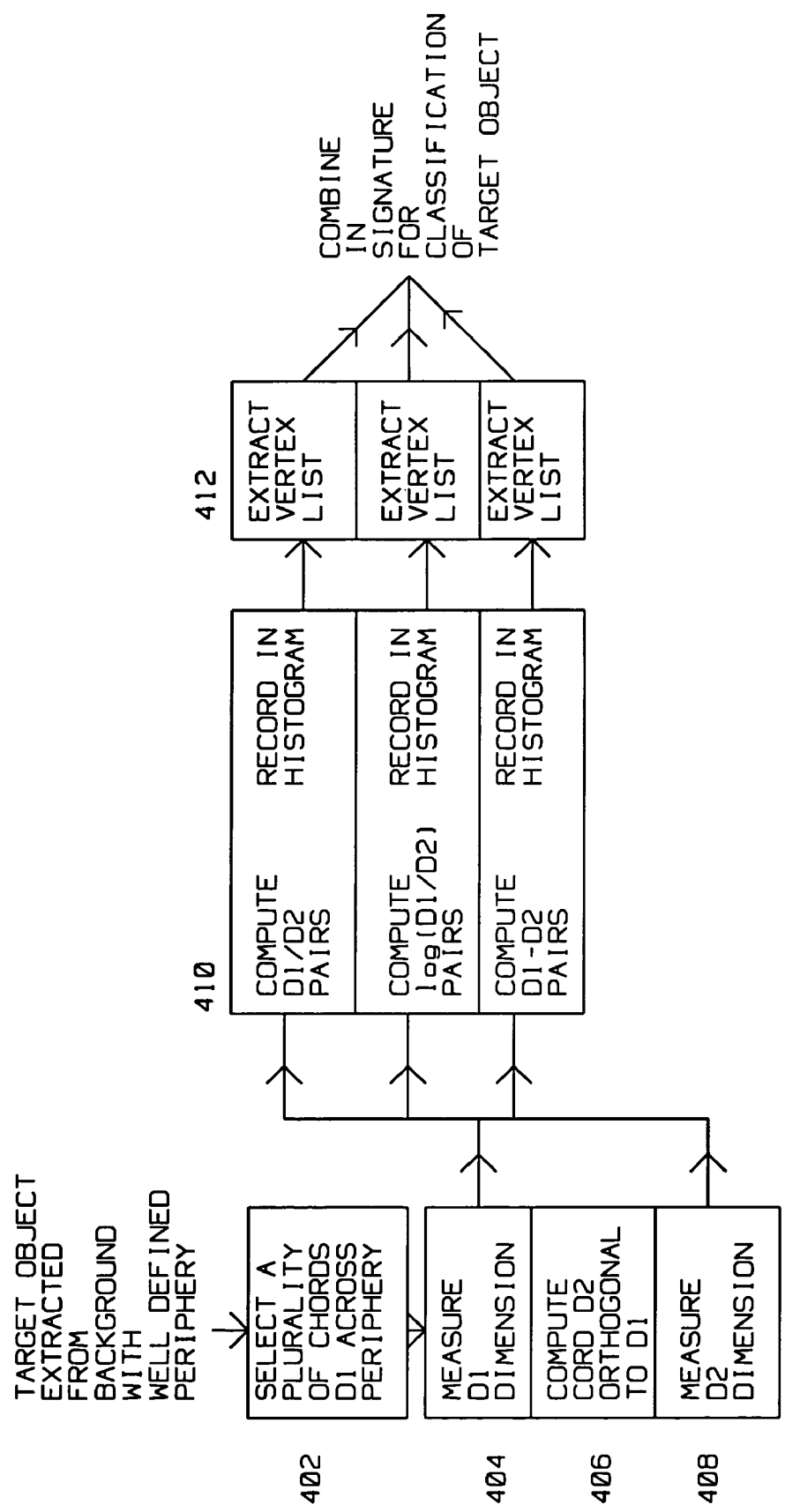
FIG. 4 shows the flow diagram of the classification method for generating a signature of the target object.

Once the target object is well defined against the background so that a periphery of the target object is in high contrast to the background, the target object is classified using the following classification method steps as shown in FIGS. 3 and 4

1) 402 Select a plurality of random first chords D1 across the periphery of the target object extracted using the SAR radar and method shown in FIG. 2.

2) 404 Measure each of said first chords D1 to obtain a plurality of first dimensions.

3) 406 Compute for each of said first chords D1 a second chord D2 across said periphery thus forming a plurality of pairs of chords. Each chord D1 is preferably orthogonal to chord D2 for each D1, D2 pair, although the method will also work with other than orthogonal D1, D2 pairs.

4) 408 Measure said second chords D2 for all pairs to obtain second dimensions.

5) In block 410 compute for each of said pairs of first chords D1 and second chords D2 the ratio D1/D2 of said first dimension D1 to said second dimension D2 to obtain a plurality of first values D1/D2.

6) In the same block 410, concurrently compute the logarithm of said first values log(D1/D2) to obtain a plurality of logarithmic values.

7) In the same block 410, compute difference (D1−D2) values;

8) In the same block 410, record said first values D1/D2 in a first histogram. A histogram is a graphic representation of a frequency distribution in which the widths of contiguous vertical bars are proportional to the class widths of the variable and the heights of the bars (vertexes) are proportional to the class frequencies *American Heritage Dictionary*.

9) In the same block 410, record said logarithmic log(D1/D2) values in a second histogram.

10) In the same block 410, record said difference (D1−D2) values in a third histogram.

11) In block 412 extract a first vertex list from said first histogram.

12) In the same block 412, extracting a second vertex list from said second histogram;

13) In the same block 412, extracting a third vertex list from said third histogram.

14) Combine said first vertex list, and/or said second vertex list, and/or said third vertex list to obtain a signature. This signature is indicative of the classification of the object target.

Typically, the first dimension and said second dimension are measured in units no larger than the smaller of 0.1 times said first dimension or 0.1 times said second dimension, to preclude loss of accuracy during the formation of ratios and differences.

The log(D1/D2) is preferably computed using a base 10 logarithm. A base e is also suitable, as well as any other base giving the general compressive effects of a logarithmic function.

The first histogram records distance D1 as a function of probability of said distance D1 for said target object. Similarly, the second histogram records log(D1/D2) as a function of probability for said target object. Using the same principle, the third histogram records D1−D2 as a function of probability for said target object.

All references cited in this document are incorporated herein in their entirety by reference.

Although presented in exemplary fashion employing specific embodiments, the disclosed structures are not intended to be so limited. For example, while a SAR radar is used as an example to extract the periphery of a target object to be classified, other imaging means are contemplated. Sonar generated images are one example of good candidates for this method. Video acquired images, transmitted using a medium with noisy characteristics, can also benefit form this method because of its tolerance to image imperfections, the equivalent of cracks, and dust.

Those skilled in the art will also appreciate that numerous changes and modifications could be made to the embodiment described herein without departing in any way from the invention.

The invention claimed is:

1. A synthetic aperture radar for acquiring a target object in a scene and computing a classification for said target object, said synthetic aperture radar comprising:

analog to digital converters for converting a plurality of radar returns from said scene into a digital stream;

a computer for:

converting said digital stream into a synthetic aperture image;

extracting portions of said synthetic aperture image containing said target object to obtain a target region;

applying noise compensation to said target region to obtain a noise compensated target region;

applying anisotropic diffusion to said noise compensated target region to obtain an isolated target object;

applying a low pass filter to said isolated target object to obtain a low pass filtered isolated target;

applying gray scale segmentation to said low pass filtered isolated target to obtain a segmented target;

applying object signal extraction to said segmented target to obtain a segmented image of said target subject, said segmented image having a periphery;

selecting a plurality of random first chords across said periphery;

measuring each of said first chords to obtain a plurality of first dimensions;

computing for each of said first chords a second chord across said periphery thus forming a plurality of pairs of chords;

measuring said second chords to obtain second dimensions;

computing for each of said pairs of first chords and second chords the ratio of said first dimension to said second dimension to obtain a plurality of first values;

computing the logarithm of said first values to obtain a plurality of logarithmic values;

recording said first values in a first histogram;
recording said logarithmic values in a second histogram;
extracting a first vertex list from said first histogram;
extracting a second vertex list from said second histogram;
combining said first vertex list and said second vertex list to obtain a first signature, said first signature indicative of said classification of said object target.

2. A radar as described in claim 1 wherein for each of said pairs said second chords are orthogonal to said first chords, and for each of said pairs, said second chords share a point with said first chords and said periphery.

3. A radar as described in claim 2 wherein said each first dimension is subtracted from said second dimension for each of said pairs thereby obtaining a plurality of differences, said differences recorded in a third histogram.

4. A radar as described in claim 3 wherein a third vertex list is extracted from said third histogram, said third vertex list combined with said first vertex list and said second vertex list to obtain a second signature, said second signature indicative of said classification of said object target.

5. A radar system as described in claim 4, wherein said first dimension and said second dimension are measured in units no larger than the smaller of 0.1 times said first dimension or 0.1 times said second dimension.

6. A radar system as described in claim 5 wherein said logarithm is computed using a base 10.

7. A radar system as described in claim 6 wherein said first histogram records first values as a function of probability of said first values for said target object.

8. A method for using a synthetic aperture radar for acquiring a target object in a scene and computing a classification for said target object, said method comprising the steps of:
converting a plurality of radar returns from said scene into a digital stream;
converting said digital stream into a synthetic aperture image;
extracting portions of said synthetic aperture image containing said target object to obtain a target region;
applying noise compensation to said target region to obtain a noise compensated target region;
applying anisotropic diffusion to said noise compensated target region to obtain an isolated target object;
applying a low pass filter to said isolated target object to obtain a low pass filtered isolated target;
applying gray scale segmentation to said low pass filtered isolated target to obtain a segmented target;
applying object signal extraction to said segmented target to obtain a segmented image of said target subject, said segmented image having a periphery;
selecting a plurality of random first chords across said periphery;
measuring each of said first chords to obtain a plurality of first dimensions;
computing for each of said first chords a second chord across said periphery thus forming a plurality of pairs of chords;
measuring said second chords to obtain second dimensions;
computing for each of said pairs of first chords and second chords the ratio of said first dimension to said second dimension to obtain a plurality of first values;
computing the logarithm of said first values to obtain a plurality of logarithmic values;
recording said first values in a first histogram;
recording said logarithmic values in a second histogram;
extracting a first vertex list from said first histogram;
extracting a second vertex list from said second histogram;
combining said first vertex list and said second vertex list to obtain a first signature, said first signature indicative of said classification of said object target.

9. A method as described in claim 8 wherein for each of said pairs said second chords are orthogonal to said first chords, and for each of said pairs, said second chords share a point with said first chords and said periphery.

10. A method as described in claim 9 wherein said each first dimension is subtracted from said second dimension for each of said pairs thereby obtaining a plurality of differences, said differences recorded in a third histogram.

11. A method as described in claim 10 wherein a third vertex list is extracted from said third histogram, said third vertex list combined with said first vertex list and said second vertex list to obtain a second signature, said second signature indicative of said classification of said object target.

12. A method as described in claim 11, wherein said first dimension and said second dimension are measured in units no larger than the smaller of 0.1 times said first dimension or 0.1 times said second dimension.

13. A method as described in claim 12 wherein said logarithm is computed using a base 10.

14. A method as described in claim 13 wherein said first histogram records distance as a function of probability of said distance for said target object.

15. A method for classification of a target object having a periphery comprising the steps of:
selecting a plurality of random first chords D1 across said periphery of said target object;
measuring each of said first chords D1 to obtain a plurality of first dimensions;
computing for each of said first chords D1 a second chord D2 across said periphery thus forming a plurality of pairs of chords;
measuring said second chords D2 for all pairs to obtain second dimensions;
computing for each of said pairs of first chords D1 and second chords D2 the ratio D1/D2 of said first dimension to said second dimension to obtain a plurality of first values;
computing the logarithm of said first values to obtain a plurality of logarithmic values;
computing difference values by subtracting said second dimension from said first dimension for each of said pairs;
recording said first values in a first histogram;
recording said logarithmic values in a second histogram;
recording said difference values in a third histogram;
extracting a first vertex list from said first histogram;
extracting a second vertex list from said second histogram;
extracting a third vertex list from said third histogram;
combining said first vertex list, and/or said second vertex list, and/or said third vertex list to obtain a signature, said signature indicative of the classification of said object target.

16. A method as claimed in claim 15 wherein for each of said pairs said second chords are orthogonal to said first chords, and for each of said pairs, said second chords share a point with said first chords and said periphery.

* * * * *